United States Patent
Rouet et al.

(10) Patent No.: US 7,624,255 B1
(45) Date of Patent: Nov. 24, 2009

(54) SCHEDULING PROGRAM INSTRUCTION EXECUTION BY USING FENCE INSTRUCTIONS

(75) Inventors: Christian Rouet, San Rafael, CA (US); Rui M. Bastos, Porto Alegre (BR); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 347 days.

(21) Appl. No.: 11/076,201

(22) Filed: Mar. 9, 2005

(51) Int. Cl.
*G06F 9/30* (2006.01)
(52) U.S. Cl. .................................................. 712/220
(58) Field of Classification Search .................. 712/220
See application file for complete search history.

(56) References Cited

U.S. PATENT DOCUMENTS

| | | | |
|---|---|---|---|
| 4,847,755 A * | 7/1989 | Morrison et al. | 712/203 |
| 2004/1001256 * | 1/2004 | Papakipos et al. | 345/157 |
| 2005/0154866 A1 * | 7/2005 | Steely et al. | 712/228 |

\* cited by examiner

*Primary Examiner*—Eddie P Chan
*Assistant Examiner*—Robert E Fennema
(74) *Attorney, Agent, or Firm*—Patterson & Sheridan, LLP (57) ABSTRACT

A system and method controls the scheduling of program instructions included in a shader program for execution by a processing pipeline. One or more fence instructions may be inserted into the shader program. Each fence instruction specifies a constraint that is applied to control the scheduling of another program instruction in the shader program. Controlling the scheduling of program instructions for execution by the processing pipeline may result in a more efficient use of computing resources and improved performance.

15 Claims, 5 Drawing Sheets

SCHEDULING PROGRAM INSTRUCTION EXECUTION BY USING FENCE INSTRUCTIONS

BACKGROUND OF THE INVENTION

1. Field of the Invention

Embodiments of the present invention generally relate to program instruction execution and, more specifically, to controlling the scheduling of program instruction execution in a processing pipeline.

2. Description of the Related Art

Conventional three-dimensional (3D) graphics processing includes executing program instructions in processing units configured in a pipeline. Sometimes graphics data is processed in multiple passes through the pipeline. Although more than one processing unit in the pipeline may be capable of executing a particular instruction, it may be advantageous to have a specific unit in the pipeline execute the instruction. For example, values computed when an upstream processing unit executes a first program instruction may be needed as inputs by a downstream unit to execute a second program instruction. Also, if the first program instruction is scheduled for execution by the downstream processing unit, the values may need to be fed back to the upstream unit and provided to the downstream unit to execute the second program instruction in a second pass through the pipeline.

Accordingly, there is a need to control the scheduling of program instructions for execution in a pipeline.

SUMMARY OF THE INVENTION

The current invention involves new systems and methods for controlling the scheduling of program instructions for execution in a processing pipeline. One or more fence instructions may be inserted into a sequence of program instructions. Each fence instruction controls the scheduling of another program instruction in the sequence of program instructions. Controlling the scheduling of a program instruction for execution by a particular processing unit or for execution in a subsequent pass through the processing pipeline may result in a more efficient use of processing pipeline resources and improved performance.

Various embodiments of the invention include a system for scheduling execution of program instructions. The system includes a first processing unit, a second processing unit, and a instruction scheduling unit. The first processing unit is configured to execute a first set of program instructions and forward source operands to the second processing unit. The second processing unit is configured to execute a second set of program instructions. The instruction scheduling unit is configured to execute fence program instructions that specify scheduling constraints applying to the first set of program instructions and the second set of program instructions.

Various embodiments of a method of the invention for controlling the scheduling of program instruction execution include determining that a program instruction within a sequence of program instructions should be explicitly scheduled for execution by a processing pipeline and inserting a fence instruction into the sequence of program instructions to produce a modified sequence of program instructions, wherein the fence instruction specifies that the program instruction should be scheduled for execution by a first processing unit in a first pass through the processing pipeline or by any processing unit in a second pass through the processing pipeline.

Various embodiments of a method of the invention for executing a sequence of program instructions including a first program instruction specifying a scheduling constraint for a second program instruction include determining whether a processing unit in a processing pipeline specified by the first program instruction is available to execute the second program instruction and scheduling the second program instruction for execution by the processing unit if the processing unit is available to execute the second program instruction in a first pass through the processing pipeline or scheduling the second program instruction for execution during a second pass through the processing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
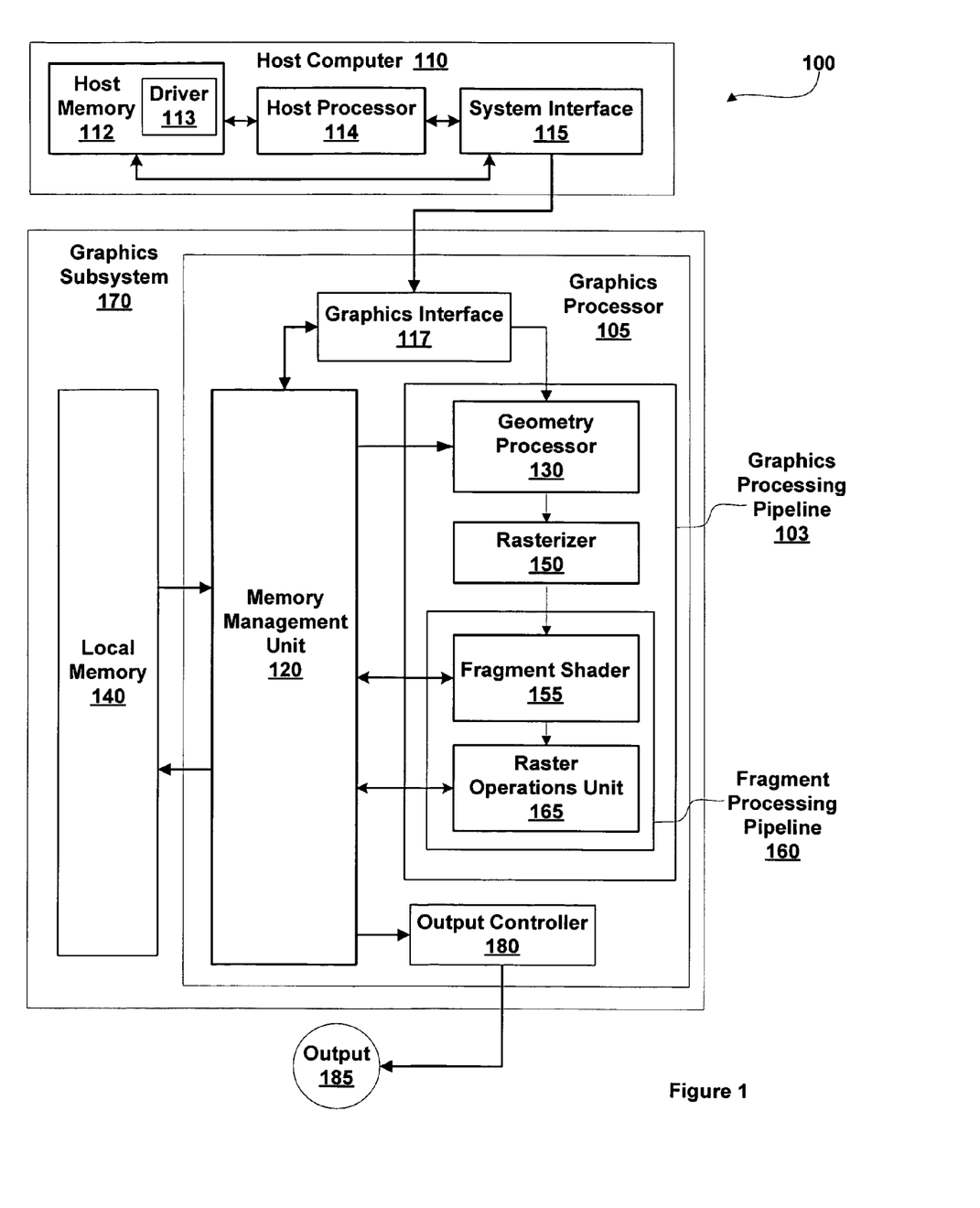
FIG. 1 is a block diagram of a graphics processing system in accordance with one or more aspects of the present invention.

FIG. 1 is a block diagram of an exemplary embodiment of a respective computer system, generally designated 100, and including a host computer 110 and a graphics subsystem 170 in accordance with one or more aspects of the present invention. Computing system 100 may be a desktop computer, server, laptop computer, palm-sized computer, tablet computer, game console, portable wireless terminal such as a PDA or cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. An example of system interface 115 known in the art includes Intel® Northbridge.

Figure 3A:
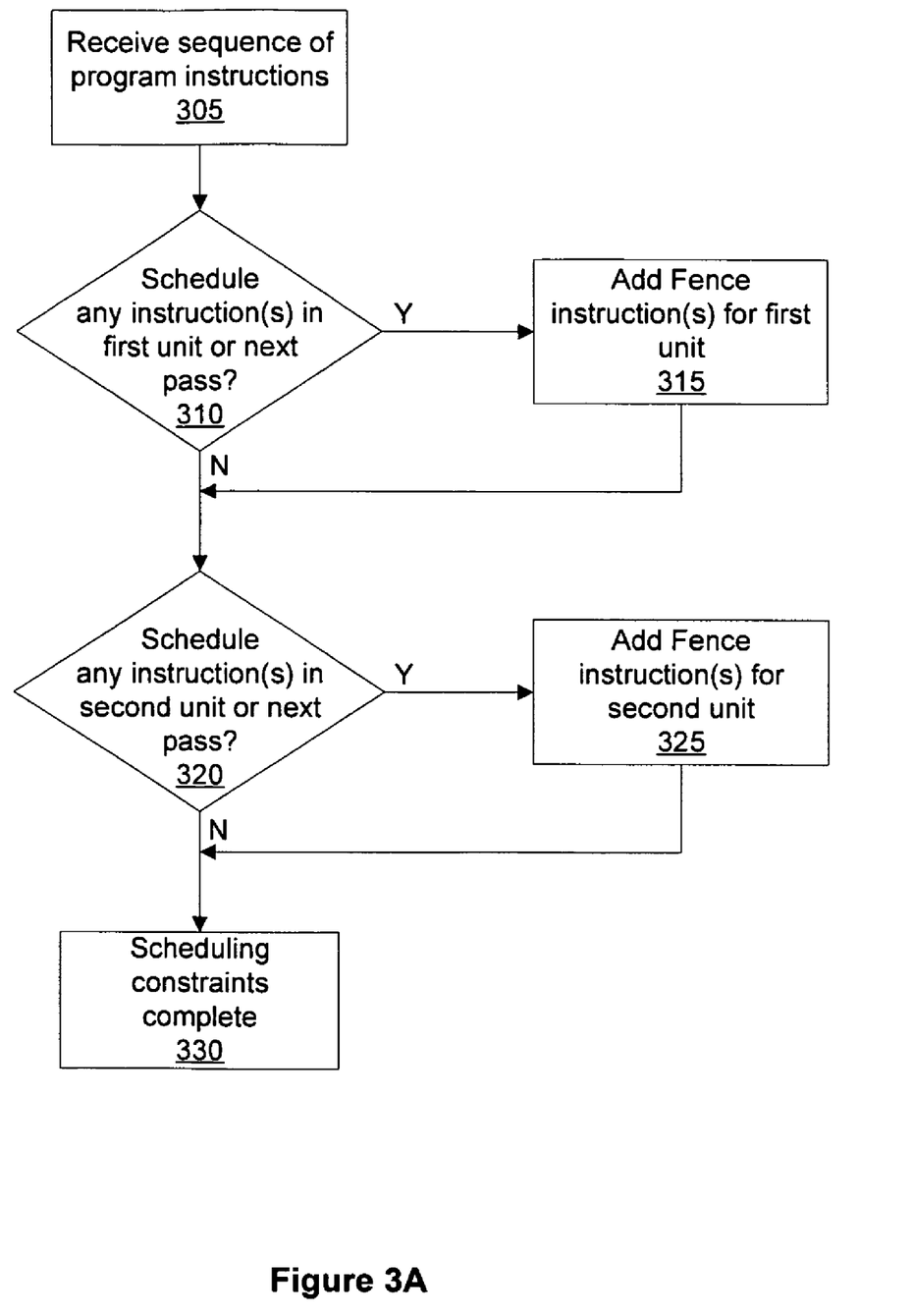
FIG. 3A illustrates a flow diagram of an exemplary method of controlling the scheduling of program instruction execution in accordance with one or more aspects of the present invention.

A graphics device driver, driver 113, interfaces between processes executed by host processor 114, such as application programs, and a programmable graphics processor 105, translating program instructions as needed for execution by programmable graphics processor 105. Driver 113 also uses commands to configure sub-units within programmable graphics processor 105. Specifically, driver 113 may insert a fence instruction to constrain scheduling execution of a particular program instruction within an instruction sequence, as described in conjunction with FIG. 3.

Graphics subsystem 107 includes a local memory 140 and programmable graphics processor 105. Host computer 110 communicates with graphics subsystem 170 via system interface 115 and a graphics interface 117 within programmable graphics processor 105. Data, program instructions, and commands received at graphics interface 117 can be passed to a graphics processing pipeline 803 or written to a local memory 140 through memory management unit 120. Programmable graphics processor 105 uses memory to store graphics data, including texture maps, and program instructions, where graphics data is any data that is input to or output from computation units within programmable graphics processor 105. Graphics memory is any memory used to store graphics data or program instructions to be executed by programmable graphics processor 105. Graphics memory can include portions of host memory 112, local memory 140 directly coupled to programmable graphics processor 105, storage resources coupled to the computation units within programmable graphics processor 105, and the like. Storage resources can include register files, caches, FIFOs (first in first out memories), and the like.

In addition to Interface 117, programmable graphics processor 105 includes a graphics processing pipeline 103, a memory controller 120 and an output controller 180. Data and program instructions received at interface 117 can be passed to a geometry processor 130 within graphics processing pipeline 103 or written to local memory 140 through memory controller 120. In addition to communicating with local memory 140, and interface 117, memory controller 120 also communicates with graphics processing pipeline 103 and output controller 180 through read and write interfaces in graphics processing pipeline 103 and a read interface in output controller 180.

Within graphics processing pipeline 103, geometry processor 130 and a programmable graphics fragment processing pipeline, fragment processing pipeline 160, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 130 and fragment processing pipeline 160 are optionally configured such that data processing operations are performed in multiple passes through graphics processing pipeline 103 or in multiple passes through fragment processing pipeline 160. Each pass through programmable graphics processor 105, graphics processing pipeline 103 or fragment processing pipeline 160 concludes with optional processing by a raster operations unit 165.

Vertex programs are sequences of vertex program instructions compiled by host processor 114 for execution within geometry processor 130 and rasterizer 150. Shader programs are sequences of shader program instructions compiled by host processor 114 for execution within fragment processing pipeline 160. Geometry processor 130 receives a stream of program instructions (vertex program instructions and shader program instructions) and data from interface 117 or memory controller 120, and performs vector floating-point operations or other processing operations using the data. The program instructions configure subunits within geometry processor 130, rasterizer 150 and fragment processing pipeline 160. The program instructions and data are stored in graphics memory, e.g., portions of host memory 112, local memory 140, or storage resources within programmable graphics processor 105. When a portion of host memory 112 is used to store program instructions and data the portion of host memory 112 can be uncached so as to increase performance of access by programmable graphics processor 105. Alternatively, configuration information is written to registers within geometry processor 130, rasterizer 150 and fragment processing pipeline 160 using program instructions, encoded with the data, or the like.

Data processed by geometry processor 130 and program instructions are passed from geometry processor 130 to a rasterizer 150. Rasterizer 150 is a sampling unit that processes primitives and generates sub-primitive data, such as fragment data, including parameters associated with fragments (texture identifiers, texture coordinates, and the like). Rasterizer 150 converts the primitives into sub-primitive data by performing scan conversion on the data processed by geometry processor 130. Rasterizer 150 outputs fragment data and shader program instructions to fragment processing pipeline 160.

The shader programs configure the fragment processing pipeline 160 to process fragment data by specifying computations and computation precision. Fragment shader 155 is optionally configured by shader program instructions such that fragment data processing operations are performed in multiple passes within fragment shader 155. Fragment shader 155 includes one or more fragment shader pipelines which may be configured to perform shading functions such as, attribute interpolation, perspective correction, texture mapping, blending, and the like, as described in conjunction with FIG. 2 to produce shaded fragment data.

Fragment shader 155 outputs the shaded fragment data, e.g., color and depth, and codewords generated from shader program instructions to raster operations unit 165. Raster operations unit 165 includes a read interface and a write interface to memory controller 120 through which raster operations unit 165 accesses data stored in local memory 140 or host memory 112. Raster operations unit 165 optionally performs near and far plane clipping and raster operations, such as stencil, z test, blending, and the like, using the fragment data and pixel data stored in local memory 140 or host memory 112 at a pixel position (image location specified by x,y coordinates) associated with the processed fragment data. The output data from raster operations unit 165 is written back to local memory 140 or host memory 112 at the pixel position associated with the output data and the results, e.g., image data are saved in graphics memory.

When the data, program instructions, and commands received by graphics subsystem 170 have been completely processed by graphics processor 105, an output 185 of graphics subsystem 170 is provided using an output controller 180. Output controller 180 is optionally configured to deliver processed data to a display device, network, electronic control system, other computing system such as computing system 100, other graphics subsystem 170, or the like. Alternatively, the processed data is output to a film recording device or written to a peripheral device, e.g., disk drive, tape, compact disk, or the like.

Figure 2:
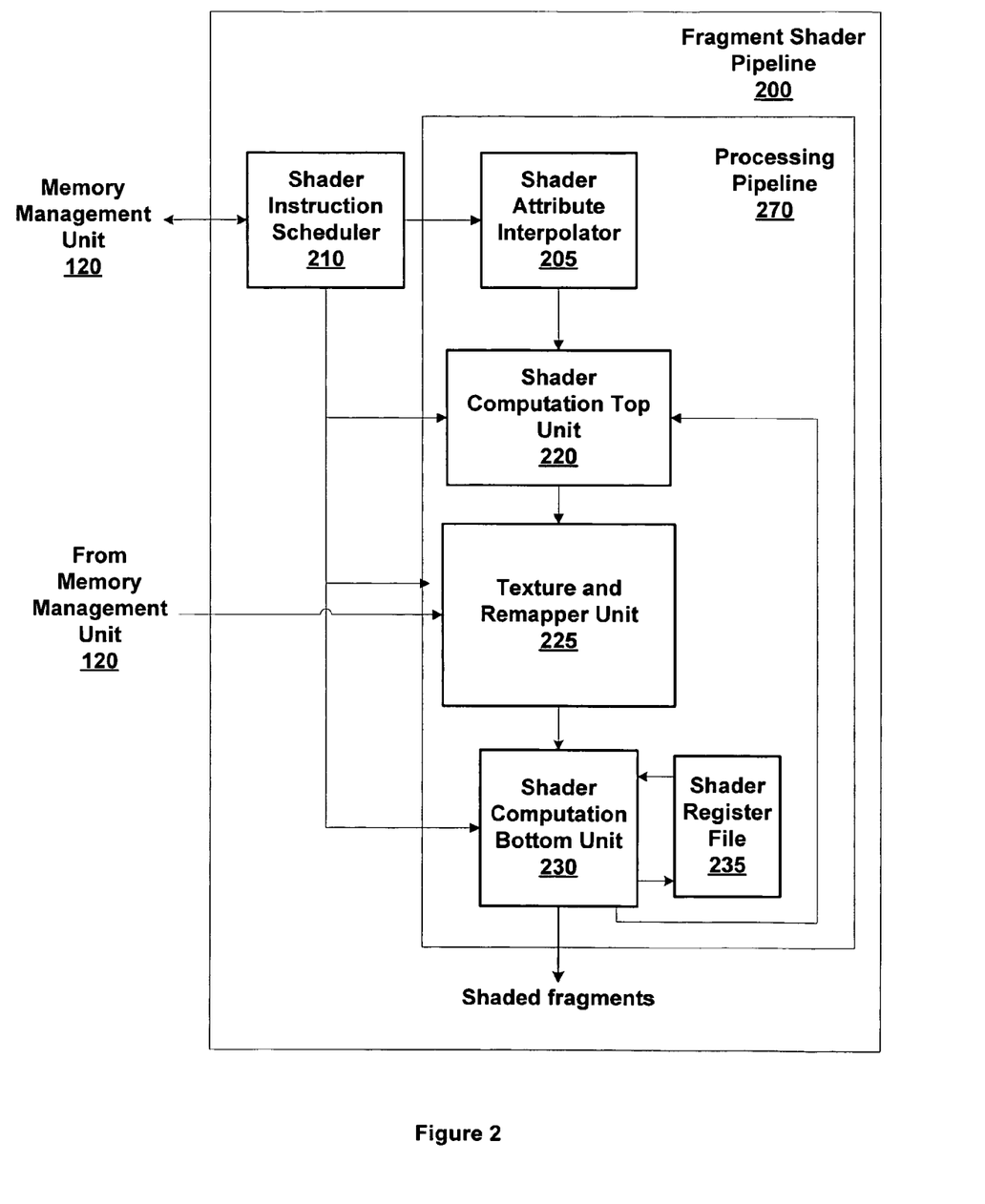
FIG. 2 is a block diagram of a portion of the graphics processor shown in FIG. 1 in accordance with one or more aspects of the present invention.

FIG. 2 is a block diagram of a portion of fragment shader 155 shown in FIG. 1 in accordance with one or more aspects of the present invention. One or more fragment shader pipelines 200 may be included within fragment shader 155. Each fragment shader pipeline 200 is configured to receive shader program instructions, including sequences of program instructions, and fragment data that are processed according to the shader program instructions to produce shaded fragments. The shaded fragments are output by fragment shader 155 to raster operations unit of FIG. 1.

A shader instruction scheduler 210 receives program instructions and schedules each program instruction for execution by a processing unit in a processing pipeline 270, such as a shader attribute interpolator 205, a shader computation top unit 220, a texture and remapper unit 225, or a shader computation bottom unit 230. In some embodiments of the present invention, the program instructions are read by shader instruction scheduler 210 from local memory 140 via memory management unit 120.

Shader attribute interpolator 205 produces interpolated attributes, such as texture coordinates, barycentric coefficients, depth (z or w), color components, or the like, that may be sourced by the other processing units within processing pipeline 270. Shader computation top unit 220 receives microcode instructions from shader instruction scheduler 210 and source operands from shader register file 235 via shader computation bottom unit 230 and/or shader attribute interpolator 205. Shader computation top unit 220 performs perspective correction of the interpolated attributes and other operations requiring division and multiplication. Texture and remapper unit 225 computes texture map addresses and reads texture data via memory management unit 120. Shader computation bottom unit 230 receives microcode instructions from shader instruction scheduler 210 and source operands from shader register file 235, and/or shader attribute interpolator 205, and/or shader computation bottom unit 230, and/or texture and remapper unit 225. Shader computation bottom unit 330 may store temporary values, e.g., destination operands, in shader register file 335 for use by shader computation top unit 320, texture and remapper unit 325, and shader computation bottom unit 330. Shader computation bottom unit 330 processes texture data and interpolated attributes to produce shaded fragments for output by fragment shader 155.

A shader register file 235 is a shared storage resource used to store temporary values needed during execution of the shader programs. In some embodiments of the present invention up to two registers may be read during a pass through processing pipeline. Values read from the two registers may be provided as source operands to shader computation bottom unit 230 in the pass in which they are read or to shader computation top unit 220 and/or texture and remapper unit 225 in the following pass. Shader instruction scheduler 210 schedules instructions for execution based on allowed register usage, i.e., the ability of shader register file 235 to provide source operands to the processing units. For example, register usage is exceeded when the number of registers providing source operands for one program instruction is greater than the number of registers that can be read in a single pass.

Each processing unit within processing pipeline 270 is configured to execute specific program instructions. Shader instruction scheduler 210 schedules execution of each program instruction by a processing unit that is capable of performing the operation(s) specified by the program instruction. For example, shader computation top 220 may be configured to perform operations including multiplication, division, and reciprocal. Texture and remapper unit 225 may be configured to perform operations including derivative calculation, texture addressing, and interpolation. Shader computation bottom unit 230 may be configured to perform operations including addition, cosine, sine, dot product, logarithm, and multiplication. In other embodiments of the present invention, additional processing units may be included in fragment shader pipeline 200.

Shader instruction scheduler 210 schedules each program instruction within a sequence of program instructions for execution in the order that they are in the shader program. Shader instruction scheduler 210 generates and dispatches a microcode instruction, called a very large instruction word (VLIW) that includes all of the program instructions which are scheduled for execution in a single pass through processing pipeline 270. The VLIW includes a slot for each processing unit and each slot may or may not be populated with a program instruction in order to schedule the program instruction for execution by the processing unit corresponding to the slot. In some embodiments of the present invention, a slot is not included for shader attribute interpolator 205 because it does not process shader program instructions, but instead provides source operands, e.g., interpolated attributes, to shader computation top unit 220.

Shader instruction scheduler 210 uses a greedy allocation algorithm to schedule program instructions for execution by determining whether or not to place each program instruction into a slot in the VLIW. Specifically, shader instruction scheduler 210 considers each program instruction in order and determines whether that program instruction will be placed in the VLIW taking into account hardware constraints, e.g., allowed register usage, capabilities of the processing units, and availability of the processing units, as well as instructions already placed in the VLIW. If the program instruction may not be placed in the VLIW, the VLIW is dispatched to processing pipeline 270 so that program instructions already included in the VLIW, i.e., previously scheduled program instructions, are executed by processing units corresponding to slots that are populated. The program instruction is then placed in a new VLIW in order to schedule the program instruction for execution in the next pass through processing pipeline 270.

In one embodiment of the present invention, the greedy allocation algorithm used by shader instruction scheduler 210 attempts to schedule each program instruction for processing by the topmost processing unit in processing pipeline 270, where shader computation top unit 220 is the topmost processing unit. When the topmost processing unit is either not available or is not capable of processing a first program instruction, shader instruction scheduler 210 moves to the next topmost processing unit. If the first program instruction cannot be scheduled for execution in the current VLIW, then the current VLIW is output for execution by processing pipeline 270. If the first program instruction is scheduled for execution in the current VLIW, then a subsequent instruction may not be scheduled for execution in the same VLIW by a processing unit that is above the processing unit which will execute the first program instruction. For example, when the first program instruction is scheduled for execution by texture and remapper unit 225 in a first VLIW a second program instruction (subsequent to the first program instruction) may not be scheduled for execution by shader computation top unit 220 in the first VLIW. Likewise, when the first program instruction is scheduled for execution by shader computation bottom unit 230 in the first VLIW, the second program instruction may not be scheduled for execution by either texture and remapper unit 225 or shader computation top unit 220 in the first VLIW.

In some embodiments of the present invention, driver 113 or a shader program compiler may be configured to reorder program instructions when possible to improve performance using techniques known to those skilled in the art. Driver 113 or a shader program compiler may also be configured to insert fence program instructions to explicitly constrain scheduling of another program instruction for execution based on knowledge of the scheduling algorithm used by shader instruction scheduler 210. FIG. 3A illustrates a flow diagram of an exemplary method of controlling the scheduling of program instruction execution in accordance with one or more aspects of the present invention.

In step 305 driver 113 receives a sequence of program instructions. In step 310 driver 113 determines if any program instructions within the sequence should be scheduled for execution by a first processing unit, such as shader computation top unit 220 within processing pipeline 270, in a first pass or scheduled for execution in the next pass, i.e., a second pass. A method of performing step 310 is described below in conjunction with FIG. 3B.

If, in step 310 driver 113 determines that one or more of the program instructions within the sequence should be preferably scheduled for execution by the first processing unit in the first pass or scheduled for execution in the next pass, then in step 315 driver 113 adds a fence instruction for each such program instruction identified in step 310. The method then proceeds to step 320. In some embodiments of the present invention, a field within the fence instruction is used to specify the processing unit which should execute an identified program instruction. The fence instruction may be inserted immediately ahead of the program instruction which it constrains. Processing of fence program instructions by shader instruction scheduler 210 is described in conjunction with FIG. 4.

If, in step 310 driver 113 determines that one or more of the program instructions within the sequence should not preferably be scheduled for execution by the first processing unit in the first pass or scheduled for execution in the next pass, then driver 113 proceeds directly to step 320. In step 320 driver 113 determines if one or more of the program instructions within the sequence should be scheduled for execution by a second processing unit, such as shader computation bottom unit 230 within processing pipeline 270, in the first pass or scheduled for execution in the next pass. A method of performing step 320 is described in conjunction with FIG. 3C.

If, in step 320 driver 113 determines that one or more of the program instructions within the sequence should be preferably scheduled for execution by the second processing unit in the first pass or scheduled for execution in the next pass, then in step 325 driver 113 adds a fence instruction for each such program instruction identified in step 320. The method then proceeds to step 330. If, in step 320 driver 113 determines that one or more of the program instructions within the sequence should not preferably be scheduled for execution by the second processing unit in the first pass or scheduled for execution in the next pass, then driver 113 proceeds directly to step 330. In step 330 driver 113 has completed generation of a modified sequence of program instructions including one or more fence instructions to constrain scheduling of program instruction execution.

Figure 3B:
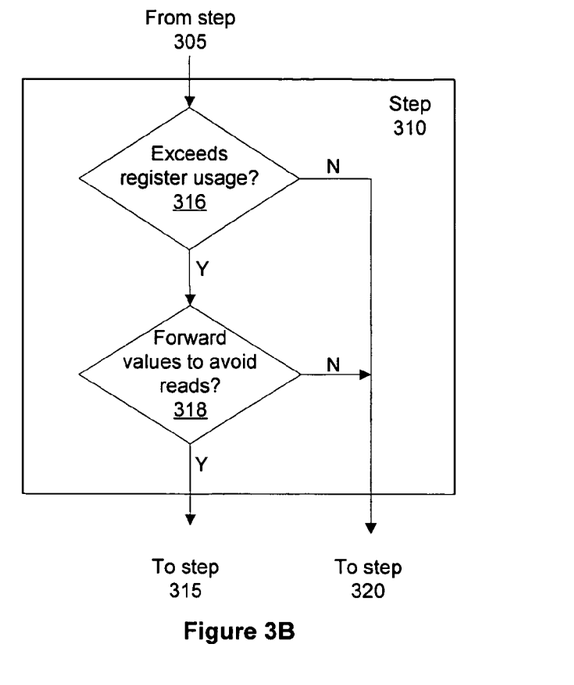
FIG. 3B illustrates a flow diagram of an exemplary method of performing a step shown in FIG. 3A in accordance with one or more aspects of the present invention.

FIG. 3B illustrates a flow diagram of an exemplary method of performing step 310 of FIG. 3A in accordance with one or more aspects of the present invention. In step 316 driver 113 determines if the allowed register usage will be exceeded for execution of a program instruction in addition to already scheduled (but not dispatched) program instructions. For example, register usage is exceeded when the number of registers providing source operands for one program instruction is greater than the number of registers that can be read from shader register file 235 in a single pass. In that case, an additional pass may be needed just to read one or more of the source operands, rather than process data, resulting in reduced utilization of the processing units within processing pipeline 270. If, in step 316 driver 113 determines that the allowed register usage is not exceeded, then driver 113 continues with step 320.

If, in step 316 driver 113 determines that the allowed register usage is exceeded, then in step 318 driver 113 determines if one or more values equal to one or more of the source operands can be forwarded by the first processing unit to another (downstream) processing unit that will execute the program instruction. If, in step 318 driver 113 determines that one or more values equal to one or more of the source operands cannot be forwarded by one processing unit to another processing unit, then driver 113 continues with step 320. Otherwise, in step 315 driver 113 inserts one or more fence instructions to constrain the scheduling of program instruction execution based on allowed register usage.

As an example of the foregoing, consider Table 1 which illustrates the (unmodified) sequence of program instructions scheduled for execution by shader instruction scheduler 210. The first column specifies the pass through processing pipeline 270 during which the instruction is executed. The second column specifies the processing unit scheduled to execute each program instruction, where SCT is shader computation top unit 220 and SCB is shader computation bottom unit 230. The third column is the program instruction, including source and destination operands. The fourth column specifies the operation performed by the instruction.

TABLE I

| Pass 1 | SCB | MUL r0, r1, r2     | r0 = r1 * r2        |
|--------|-----|--------------------|---------------------|
| Pass 2 |     |                    | Read r4             |
| Pass 3 | SCB | MAD r0, r0, r3, r4 | r0 = (r0 * r3) + r4 |

In the first pass, shader computation bottom unit 230 reads two values from shader register file 235, r1 and r2, multiplies the two values and stores the product, r0, in shader register file 235. In the second pass, one of the three registers providing a source operand must be read since in this embodiment of the present invention, the allowed register usage, i.e., maximum number of registers that can be read, in a single pass is two. In the third pass, the value read from r4 in pass 2 is output by shader computation bottom unit 230 to shader computation top unit 220 and then provided to shader computation bottom unit 230 via shader computation top unit 220 and texture and remapper unit 225. In the third pass, shader computation bottom unit 230 also reads two values from shader register file 235, r0 and r3.

Driver 113 may insert a fence instruction to constrain the first program instruction to be scheduled for execution by shader computation top unit 220, for example, if the register usage is exceeded. Shader computation top unit 220 may forward the value computed for r0 to shader computation bottom unit 230 for use as a source operand. Table 2 illustrates the modified sequence of program instructions scheduled for execution by shader instruction scheduler 210 including a fence instruction. SIS is shader instruction scheduler 210.

TABLE 2

| Pass 1 | SIS | FENCT              |                     |
|        | SCT | MUL r0, r1, r2     | r0 = r1 * r2        |
|        | SCB | MAD r0, r0, r3, r4 | r0 = (r0 * r3) + r4 |

In the first pass shader computation top unit 220 receives two values read from shader register file 235 during the previous pass, r1 and r2. Shader computation top unit 220 multiplies the two values and outputs the product, r0, to shader computation bottom unit 230 via texture and remapper unit 225. In the first pass, shader computation bottom unit 230 reads two values from shader register file 235, r3 and r4. Therefore, when r1 and r2 are read in the previous pass, two passes can be saved by constraining scheduling of the program instructions by inserting the fence instruction. When r1 and r2 cannot be read in the previous pass, the number of passes is reduced from 3 to 2, still resulting in a performance improvement.

Figure 3C:
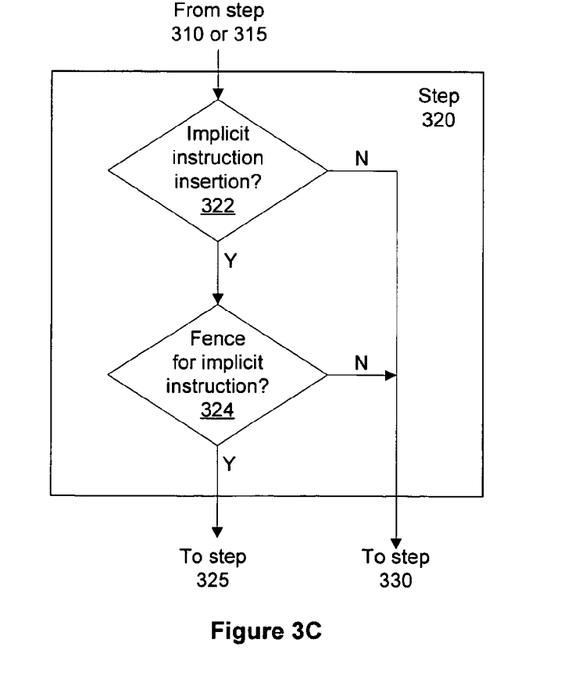
FIG. 3C illustrates a flow diagram of an exemplary method of performing another step shown in FIG. 3A in accordance with one or more aspects of the present invention.

FIG. 3C illustrates a flow diagram of an exemplary method of performing step 320 of FIG. 3A in accordance with one or more aspects of the present invention. In step 322 driver 113 determines if one or more implicit program instructions will be inserted by a hardware scheduler, such as shader instruction scheduler 210. For example, shader instruction scheduler 210 may insert one or more implicit program instructions immediately before the last program instruction in a shader program with a fog function enabled. The implicit program instructions for the fog function perspective correct a fog distance attribute sourced from shader attribute interpolator 205. Since shader computation top unit 220 is needed to perform the perspective correction, it is advantageous to schedule the execution of the last program instruction for shader computation bottom unit 230 rather than for shader computation top unit 220 in order to perform the fog function and last program instruction in a single pass through processing pipeline 270. Texture and remapper unit 225 may include a look-up table that stores fog coefficients, i.e., attenuation values, which are read using the perspective corrected fog depth value computed by shader computation top unit 220. In other embodiments of the present invention, other implicit program instructions may be inserted in the shader program by shader instruction scheduler 210 to perform other functions.

If, in step 322 driver 113 determines that one or more implicit program instructions will not be inserted by shader instruction scheduler 210, then driver 113 continues with step 330. Otherwise, in step 324 driver 113 determines if a fence instruction should be inserted to allow scheduling of an implicit program instruction, and, if not, driver 113 continues with step 330. If, in step 324 driver 113 determines that a fence instruction should be inserted to allow scheduling of the implicit program instruction, then driver 113 continues with step 325 and inserts a fence instruction. For example, a fence instruction may be inserted before the last program instruction so that the program instruction is scheduled for execution by shader computation bottom unit 230, thereby allowing scheduling of the implicit program instructions for execution by shader computation top 220 and/or texture remapper unit 225. When the implicit instructions are inserted to perform the fog function, last program instruction and the implicit instructions may be scheduled for execution in a single pass through processing pipeline 270.

Persons skilled in the art will appreciate that any system configured to perform the method steps of FIGS. 3A, 3B, and 3C, or their equivalents, is within the scope of the present invention. Further, additional steps may be included to identify other program instructions within the sequence of program instructions which may benefit from a driver or compiler inserted scheduling constraint.

Figure 4:
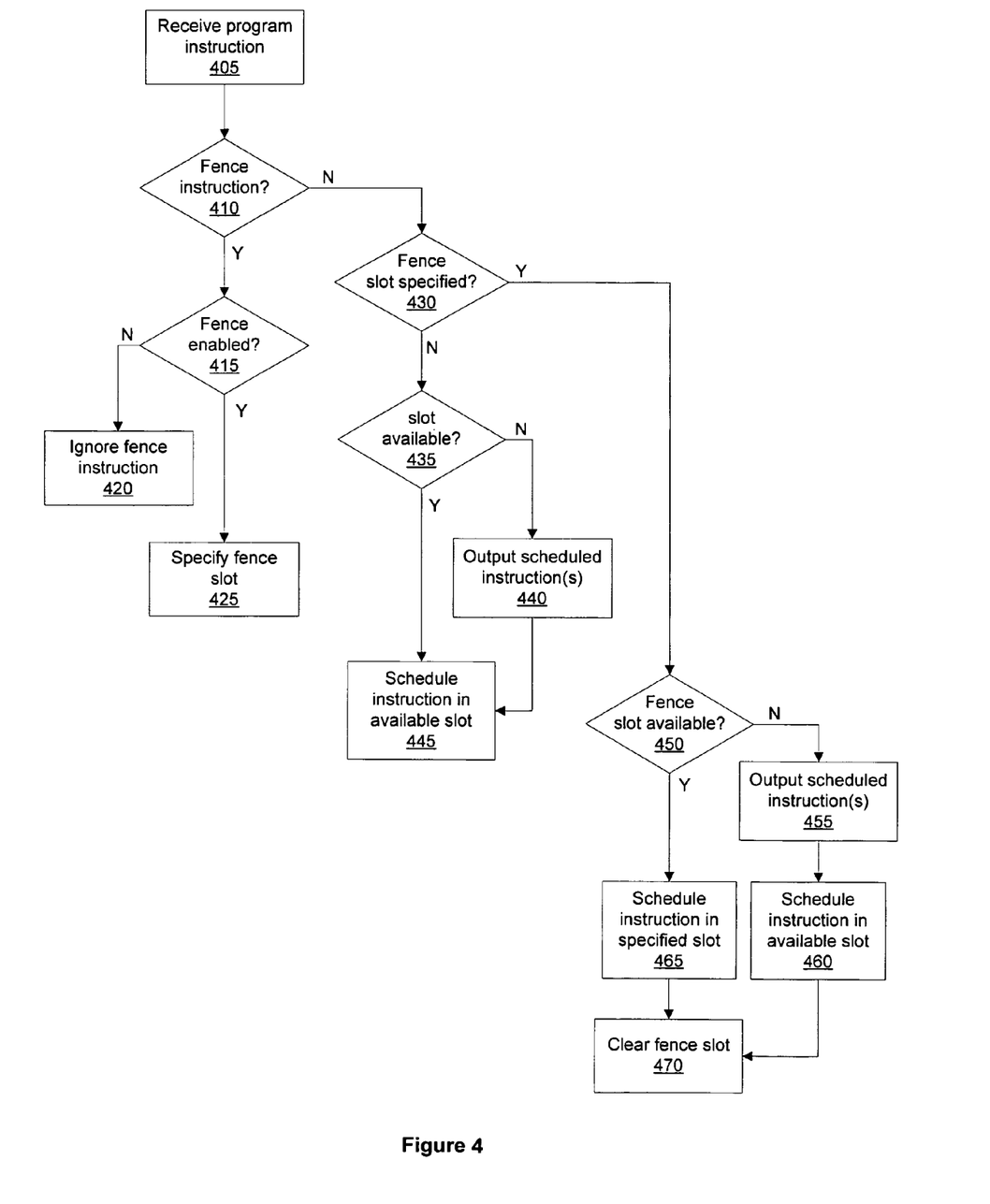
FIG. 4 illustrates a flow diagram of an exemplary method of scheduling execution of program instructions in accordance with one or more aspects of the present invention.

FIG. 4 illustrates an embodiment of a method of executing a sequence of program instructions in accordance with one or more aspects of the present invention. In step 405 shader instruction scheduler 210 receives a program instruction. In step 410, shader instruction scheduler 210 determines if the program instruction is a fence instruction, and, if so, in step 415, shader instruction scheduler 210 determines if execution of fence instructions is enabled. If, in step 415, shader instruction scheduler 210 determines that execution of fence instructions is not enabled, then in step 420, shader instruction scheduler 210 ignores the fence instruction. If, in step 415, shader instruction scheduler 210 determines that execution of fence instructions is enabled, then in step 425, shader instruction scheduler 210 specifies a fence slot corresponding to the processing unit specified by the fence instruction in the current VLIW. In one embodiment of the present invention, shader instruction scheduler 210 specifies a fence slot by setting a flag corresponding to a particular processing unit. When the next program instruction is received in step 405, it is constrained to be placed in the slot in the current VLIW specified by the fence slot. The current VLIW may include one or more program instructions already scheduled for execution by a processing unit corresponding to a slot each program instruction occupies.

If, in step 410, shader instruction scheduler 210 determines that the program instruction is not a fence instruction, then in step 430 shader instruction scheduler 210 determines whether a fence slot is specified for the current VLIW. If, in step 430 shader instruction scheduler 210 determines that a fence slot is not specified for the current VLIW, then in step 435 shader instruction scheduler 210 determines if a slot corresponding to a processing unit capable of executing the program instruction is available, i.e., is not occupied by an already scheduled program instruction. If, in step 435 a slot is not available, then in step 440 shader instruction scheduler 210 dispatches the current VLIW for execution by processing pipeline 270, and the method proceeds to step 445, where a new current VLIW is initialized with unoccupied slots, so that a slot is made available for scheduling the program instruction. If, in step 435 a slot is available in the current VLIW, then in step 445. Shader instruction scheduler 210 inserts the program instruction in the available slot, thereby scheduling the program instruction for execution by the processing unit corresponding to the slot.

If, in step 430 shader instruction scheduler 210 determines that a fence slot is specified for the current VLIW, then in step 450 shader instruction scheduler 210 determines if the slot matching the fence slot is available, i.e., unoccupied by a program instruction. If, in step 450 the fence slot is available, then in step 465 shader instruction scheduler 210 inserts the program instruction in the fence slot, thereby scheduling the program instruction for execution by a processing unit corresponding to the fence slot. If, in step 450 the fence slot is not available, then in step 455 shader instruction scheduler 210 dispatches the current VLIW for execution by processing pipeline 270, and the method proceeds to step 460. In step 460, a new current VLIW is initialized with unoccupied slots, so that the fence slot or another slot of the current VLIW is made available for scheduling the program instruction. Shader instruction scheduler 210 then inserts the program instruction in an available slot, thereby scheduling the program instruction for execution by the processing unit corresponding to the slot.

In some embodiments of the present invention, step 455 may be followed by step 465 instead of step 460. In those embodiments, a fence instruction specifies the processing unit which will execute the next program instruction, instead of permitting the next program instruction to be executed by any available processing unit after the program instructions that were previously scheduled for execution by processing pipeline 270 are dispatched, i.e., the current VLIW is output by shader instruction scheduler 210. Following steps 465 and 460, shader instruction scheduler 210 "unspecifies" the fence slot in step 470, for example by clearing the flag that was set in step 425. Persons skilled in the art will appreciate that any system configured to perform the method steps of FIG. 4 or their equivalents, is within the scope of the present invention.

As an example of the foregoing, consider Table 3 which illustrates the sequence of program instructions scheduled for execution by shader instruction scheduler 210. The sequence of program instructions includes fence instructions inserted by driver 113 or a compiler. The first column specifies the pass through processing pipeline 270 during which the program instruction is executed. The second column specifies the processing unit scheduled to execute each program instruction, where SCT is shader computation top unit 220 and SCB is shader computation bottom unit 230. All fence instructions, e.g., FENCT and FENCB, are executed by shader instruction scheduler 210, shown as SIS in the second column. The third column includes the program instructions, including source and destination operands.

TABLE 4

| Pass 1 | SIS | FENCT |
|--------|-----|-------|
|        | SCT | DP3 r0.x, g[TEX0], c0 |
|        | SIS | FENCB |
|        | SCB | MUL r0.w, r0, c0 |
|        | SIS | FENCT |
| Pass 2 | SCT | MUL r0.x, r0, c0 |
|        | SCB | MUL r0.zw, r0, c0 |
| Pass 3 | SCT | MUL r0.xy, r0, c0 |
|        | SIS | FENCT |
|        | SIS | FENCT |
|        | SIS | FENCB |
|        | SCB | MUL r1, r0, r0 |
|        | SIS | FENCT |
| Pass 4 | SCT | ADD r2.x, r0, r0 |
|        | SIS | FENCB |
|        | SCB | MAD r0, r0, r1, r2.x |

The first FENCT instruction specifies that the next instruction should be scheduled for execution by shader computation top unit 220 in the VLIW that is executed in the first pass through processing pipeline 270. Therefore, the DP3 program instruction is scheduled for execution by shader computation top unit 220. DP3 performs a dot product operation using source operands, g[TEX0] from shader attribute interpolator 205 and c0 from shader register file 235 to compute a value for r0.x. Shader instruction scheduler 210 executes the first FENCB instruction and specifies the fence slot as the slot in the VLIW for pass 1 corresponding to shader computation bottom unit 230. Shader instruction scheduler 210 then schedules the next instruction in the specified fence slot, inserting the MUL instruction into the VLIW for the first pass. Source operands r0.x and c0 are forwarded from shader computation top unit 220 to shader computation bottom unit 230. Shader computation bottom unit 230 performs a multiplication operation and stores the result in r0.w in shader register file 235. Shader instruction scheduler 210 executes the second FENCB instruction and specifies the fence slot as the slot in the VLIW for pass 1 corresponding to shader computation bottom unit 230. Because the fence slot is occupied, the VLIW for pass 1 is dispatched by shader instruction scheduler 210 and a VLIW for pass 2 is initialized.

Shader instruction scheduler 210 schedules the second MUL program instruction for execution by shader computation top unit 220 in pass 2. In some embodiments of the present invention the fence slot is not "unspecified" when the VLIW is output, and in those embodiments the MUL program instruction must be scheduled for execution by shader computation bottom unit 220 in pass 2. Shader instruction scheduler 210 schedules the third MUL program instruction for execution by shader computation bottom unit 230. Shader instruction scheduler 210 determines that a processing unit capable of executing the fourth MUL program instruction, such as shader computation top unit 220 or shader computation bottom unit 230, is not available for scheduling. Therefore, the VLIW for pass 2 is dispatched by shader instruction scheduler 210 and a VLIW for pass 3 is initialized.

Shader instruction scheduler 210 schedules the fourth MUL program instruction for execution by shader computation top unit 220 in pass 3. Shader instruction scheduler 210 executes the second and third FENCT instructions, specifying the fence slot as the slot in the VLIW for pass 3 corresponding to shader computation top unit 220. Shader instruction scheduler 210 executes the third FENCB instruction and specifies the fence slot as the slot in the VLIW for pass 3 corresponding to shader computation bottom unit 230. Shader instruction scheduler 210 schedules the fifth MUL program instruction for execution by shader computation bottom unit 220 in pass 3. Shader instruction scheduler 210 executes the fourth FENCT instruction and specifies the fence slot as the slot in the VLIW for pass 3 corresponding to shader computation top unit 220. Shader instruction scheduler 210 determines that fence slot is specified and occupied, and therefore the ADD program instruction cannot be scheduled for execution by shader computation top unit 220 in the VLIW for pass 3. Shader instruction scheduler 210 dispatches the VLIW for pass 3 for execution by processing pipeline 270 and a VLIW for pass 4 is initialized.

The ADD program instruction is then scheduled for execution by shader computation top unit 220 in the VLIW for pass 4. Shader instruction scheduler 210 executes the fourth FENCB instruction and specifies the fence slot as the slot in the VLIW for pass 3 corresponding to shader computation bottom unit 230. If the MAD program instruction is the last program instruction in a shader program and the fog function is enabled, shader instruction scheduler 210 may insert program instructions to perform the fog function. Driver 113 or a compiler may have inserted the fourth FENCB program instruction in order to complete execution of the last program instruction and the fog function in a single pass. In this case, shader computation top unit 220 has already been scheduled to execute the ADD instruction and is not available to execute a program instruction to perform the fog function. Shader instruction scheduler 210 schedules the MAD program instruction for execution by shader computation bottom unit 230 in pass 5. If needed, the fog function may be performed in a sixth pass.

The number of clock cycles needed to execute a modified shader program that includes one or more fence program instructions inserted by a device driver or compiler may reduce the number of passes required to execute the shader program, thereby improving graphics processing speed. In some cases, it may be desirable to increase the complexity of the program to improve image quality while maintaining the same level of performance. Therefore, graphics processing performance may be improved in terms of processing speed and/or image quality by controlling the scheduling of shader program instruction execution based on hardware constraints such as allowed register usage, processing unit capabilities, and processing unit availability.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of controlling the scheduling of program instruction execution, comprising:
   determining that a first program instruction within a sequence of program instructions should be explicitly scheduled for execution by a first processing unit residing within a processing pipeline;
   generating a very large instruction word (VLIW) that includes a first slot corresponding to the first processing unit;
   inserting a fence instruction into the sequence of program instructions immediately before and separate from the first program instruction to produce a modified sequence of program instructions;
   executing the fence instruction within the modified sequence of program instructions and, in response, inserting the first program instruction into the first slot within the VLIW specified by the first fence instruction, wherein the first slot corresponds to the first processing unit; and
   dispatching the VLIW into the processing pipeline for execution.

2. The method of claim 1, wherein a device driver performs the steps of determining and inserting.

3. The method of claim 1, wherein the first processing unit is configured to forward a source operand to a second processing unit.

4. The method of claim 1, wherein the sequence of program instructions is included in a graphics shader program.

5. The method of claim 1, wherein the first processing unit is configured to process graphics data.

6. The method of claim 1, wherein the step of determining includes checking for allowed register usage.

7. The method of claim 1, wherein the step of determining includes identifying that an implicit program instruction will be inserted into the sequence of program instructions.

8. A system for scheduling execution of program instructions, comprising:
   a first processing unit residing within a processing pipeline configured to execute a first program instruction and forward source operands to a second processing unit residing within the processing pipeline;
   the second processing unit configured to execute a second program instruction; and
   an instruction scheduling unit configured to:
   generate a very large instruction word (VLIW) that includes a first slot corresponding to the first processing unit and a second slot corresponding to the second processing unit,
   execute a first fence instruction and, in response, insert the first program instruction into the first slot, wherein the first program instruction immediately follows the first fence instruction, and the first fence instruction specifies the first slot within the VLIW,
   execute a second fence instruction and, in response, insert a second program instruction into the second slot, wherein the second program instruction immediately follows the second fence instruction, and the second fence instruction specifies the second slot within the VLIW, and
   dispatch the VLIW into the processing pipeline for execution.

9. The system of claim 8, wherein at least one program instruction is included in the first set of program instructions and the second set of program instructions, and the instruction scheduling unit is further configured to schedule program instructions in the first set of program instructions and in the second set of program instructions for execution by the first processing unit or the second processing unit.

10. The system of claim 8, wherein the instruction scheduling unit is further configured to insert implicit program instructions in a sequence of program instructions.

11. The system of claim 8, wherein the instruction scheduling unit is configured to schedule execution of a program instruction that follows a fence program instruction such that execution occurs after another program instruction already scheduled for execution is dispatched.

12. A method of executing a sequence of program instructions including a fence instruction specifying a scheduling constraint for a first program instruction, the method comprising:
   generating a very large instruction word (VLIW) that includes a first slot corresponding to a first processing unit residing within a processing pipeline;
   determining whether the first processing unit in the processing pipeline is available to execute the first program instruction;
   scheduling the first program instruction for execution by the first processing unit if the first processing unit is available to execute the first program instruction in a first pass through the processing pipeline by executing the fence instruction and, in response, inserting the first program instruction into the first slot within the VLIW, wherein the first fence instruction specifies the first slot, or scheduling the first program instruction for execution by the first processing unit during a second pass through the processing pipeline, if the first processing unit is not available to execute the first program instruction in a first pass, by executing the fence instruction and, in response, inserting the first program instruction into the first slot within another VLIW, wherein the first program instruction immediately follows the fence instruction; and
   dispatching either the VLIW or the another VLIW into the processing pipeline for execution.

13. The method of claim 12, further comprising the step of scheduling an implicit program instruction for execution by the processing pipeline.

14. The method of claim 12, wherein the sequence of program instructions includes graphics shading operations.

15. The method of claim 12, wherein the first program instruction is inserted into the sequence of program instructions by a device driver or compiler.

* * * * *